(12) United States Patent
Zhu et al.

(10) Patent No.: US 11,201,369 B2
(45) Date of Patent: Dec. 14, 2021

(54) STRUCTURE AND METHOD FOR SEALING A BUTTON-TYPE LITHIUM CELL

(71) Applicant: EVE ENERGY CO., LTD., Huizhou (CN)

(72) Inventors: Junming Zhu, Huizhou (CN); Huiming Ge, Huizhou (CN); Yumei Chen, Huizhou (CN); Zhijian Zhang, Huizhou (CN); Zhongzhi Yuan, Huizhou (CN); Jincheng Liu, Huizhou (CN)

(73) Assignee: Eve Energy CO., LTD., Huizhou (CN)

( * ) Notice: Subject to any disclaimer, the term of this patent is extended or adjusted under 35 U.S.C. 154(b) by 462 days.

(21) Appl. No.: 16/303,032

(22) PCT Filed: Dec. 29, 2017

(86) PCT No.: PCT/CN2017/119680
§ 371 (c)(1),
(2) Date: Nov. 19, 2018

(87) PCT Pub. No.: WO2018/233267
PCT Pub. Date: Dec. 27, 2018

(65) Prior Publication Data
US 2021/0111454 A1    Apr. 15, 2021

(30) Foreign Application Priority Data
Jun. 20, 2017  (CN) .......................... 201710470397.4

(51) Int. Cl.
*H01M 2/04*      (2006.01)
*H01M 50/184*   (2021.01)
(Continued)

(52) U.S. Cl.
CPC ..... *H01M 50/184* (2021.01); *H01M 10/0427* (2013.01); *H01M 10/0525* (2013.01); *H01M 50/153* (2021.01); *H01M 50/197* (2021.01)

(58) Field of Classification Search
CPC ............. H01M 50/184; H01M 50/197; H01M 50/153; H01M 2/0222; H01M 2/026; H01M 2/0465; H01M 2/067; H01M 2/0404
See application file for complete search history.

(56) References Cited

U.S. PATENT DOCUMENTS 3,839,092 A * 10/1974 Hausler ................... H01M 6/12
429/116
5,945,230 A * 8/1999 Oltman ............... H01M 50/166
429/405
(Continued)

FOREIGN PATENT DOCUMENTS

CN        101322260 A       12/2008
CN        103038913 A       4/2013
(Continued)

OTHER PUBLICATIONS

Machine translation of CN 106129274 (no date).*
(Continued)

*Primary Examiner* — Amanda C. Walke
(74) *Attorney, Agent, or Firm* — Hunton Andrews Kurth LLP

(57) ABSTRACT

A structure for sealing a button-type lithium cell includes a cell cover, a sealing ring and a cell casing. The cell cover includes an overlapping structure. The overlapping structure includes a first overlapping portion, a second overlapping portion and a third overlapping portion and the third overlapping portion includes a locking portion and a sealing portion. The cell casing includes a sealing structure. The sealing structure includes a first sealing portion, a second (Continued)

sealing portion, a third sealing portion and a fourth sealing portion. The first overlapping portion abuts against the fourth sealing portion through the sealing ring, the second overlapping portion abuts against the third sealing edge through the sealing ring, the locking portion of the third overlapping portion abuts against the second sealing edge through the sealing ring, and the sealing portion of the third overlapping portion abuts against the first sealing edge through the sealing ring.

19 Claims, 4 Drawing Sheets

(51) Int. Cl.
  *H01M 50/197* (2021.01)
  *H01M 50/153* (2021.01)
  *H01M 10/04* (2006.01)
  *H01M 10/0525* (2010.01)

(56) References Cited

U.S. PATENT DOCUMENTS

| | | | |
|---|---|---|---|
| 2007/0224495 A1* | 9/2007 | Gibbons | H01M 4/244 |
| | | | 429/144 |
| 2010/0047666 A1 | 2/2010 | Tatsumi | |
| 2021/0050562 A1* | 2/2021 | Xue | H01M 50/147 |
| 2021/0091401 A1* | 3/2021 | Dong | H01M 10/0427 |

FOREIGN PATENT DOCUMENTS

| | | |
|---|---|---|
| CN | 104332647 A | 4/2015 |
| CN | 106129274 A | 11/2016 |
| CN | 107425145 A | 12/2017 |
| DE | 102010033577 A | 2/2012 |
| EP | 1691384 A1 | 8/2006 |

OTHER PUBLICATIONS

Extended European Search Report (EP 17908101.3), dated May 12, 2020.

Notice of Refusal (KR 10-2018-7033914), with translation, dated Apr. 28, 2020.

* cited by examiner

STRUCTURE AND METHOD FOR SEALING A BUTTON-TYPE LITHIUM CELL

CROSS REFERENCE TO RELATED APPLICATION

This is a National stage application, filed under 35 U.S.C. 371, of International Patent Application NO. PCT/CN2017/119680, filed on Dec. 29, 2017, which claims priority to Chinese patent application NO. CN201710470397.4 filed on Jun. 20, 2017, the contents of both of which are incorporated herein by reference in their entireties.

TECHNICAL FIELD

The present disclosure relates to techniques of a button-type lithium cell and, in particular, to a structure and method for sealing the button-type lithium cell.

BACKGROUND

As illustrated in FIG. 1, it is a sectional view of a conventional button-type lithium cell 10 before the cell is sealed. The conventional button-type lithium cell 10 includes: a cell cover 100 (as illustrated in FIG. 3), a sealing ring 200 (as illustrated in FIG. 4), a cell casing 300 (as illustrated in FIG. 5) and a jelly roll 400. The conventional button-type lithium cell 10 is assembled as follows: firstly, the sealing ring 200 is nested in the cell casing 300; secondly, a cathode of the jelly roll 400 is welded to the cell casing 300 and an anode of the jelly roll 400 is welded to the cell cover 100; thirdly, the jelly roll 400 is placed into the cell casing 300 and the cell cover 100 is closed; finally, a special-purpose device is employed to seal the cell cover 100 (as illustrated in FIG. 2).

As for the button-type lithium cell 10, a circular arc groove 310 of the cell casing 300 having a radius of 0.35 mm is formed 0.7 mm away from an opened end of the cell casing 300 and a circular arc groove 110 of the cell cover 100 having a radius of 0.5 mm is formed 1.3 mm away from the opened end of the cell cover 100. Because the circular arc groove 310 of the cell casing 300 and the circular arc groove 110 of the cell cover 100 both have so small a size that machining accuracy is difficult to guarantee, especially when the special-purpose device is rotated to seal the cell cover 100 (as illustrated in FIG. 2). Moreover, the cell cover 100 swings in a rotation sealing process and the circular arc groove 310 of the cell casing 300 has too small a size to cut into the sealing ring 200 like a cutter, so the sealing ring 200 is easily damaged and broken to result in the liquid leakage of the cell, so that the button-type lithium cell 10 is directly scrapped.

SUMMARY

The present disclosure provides a structure and method for sealing the button-type lithium cell so as to prevent a sealing ring from being damaged and broken in a sealing process and avoid the liquid leakage of the cell, thereby improving overall sealing performance of the cell.

A structure for sealing a button-type lithium cell includes: a cell cover, a sealing ring and a cell casing.

The cell cover includes an overlapping structure, the overlapping structure includes a first overlapping portion, a second overlapping portion and a third overlapping portion which are connected in sequence, and the third overlapping portion includes a locking portion and a sealing portion, where the first overlapping portion is a cylindrical side structure, the second overlapping portion is a conical side structure, the locking portion is a cylindrical side structure and the sealing portion is a conical side structure.

The cell casing includes a sealing structure, and the sealing structure includes a first sealing portion, a second sealing portion, a third sealing portion and a fourth sealing portion which are connected in sequence, where the first sealing portion and the third sealing portion are both conical side structures and the second sealing portion and the fourth sealing portion are both cylindrical side structures.

The first overlapping portion abuts against the fourth sealing portion through the sealing ring, the second overlapping portion abuts against the third sealing portion through the sealing ring, the locking portion of the third overlapping portion abuts against the second sealing portion through the sealing ring, and the sealing portion of the third overlapping portion abuts against the first sealing portion through the sealing ring.

Optionally, the sealing structure further includes a jelly roll, and the jelly roll is received in a sealed chamber formed by the cell cover and the cell casing.

Optionally, the cell cover is a hollow cylindrical structure having a first opened end and a second closed end.

Optionally, the cell casing is a hollow cylindrical structure having a first opened end and a second closed end.

Optionally, the first overlapping portion, the second overlapping portion and the third overlapping portion are formed integrally.

Optionally, the first sealing portion, the second sealing portion, the third sealing portion and the fourth sealing portion are formed integrally.

A method for sealing a button-type lithium cell, by use of the structure above, includes the steps described below.

The sealing ring is nested in the cell casing.

The cell cover is covered onto the cell casing so that the first overlapping portion abuts against the fourth sealing portion through the sealing ring, the second overlapping portion abuts against the third sealing portion through the sealing ring, the locking portion of the third overlapping portion abuts against the second sealing portion through the sealing ring.

The sealing portion of the third overlapping portion is hemmed and shrunk so that the sealing portion of the third overlapping portion abuts against the first sealing portion through the sealing ring.

The structure and method for sealing the button-type lithium cell provided in the present disclosure can prevent the sealing ring from being damaged and broken in the sealing process and avoid the liquid leakage of the cell, thereby improving the overall sealing performance of the cell.

DETAILED DESCRIPTION

It is to be noted that when a component is described as being "fixed to" another component, it may be directly on the particular component or intervening components may be on the particular component. When a component is described as being "connected to" another component, it may be directly connected to the particular component or intervening components may be connected to the particular component. The terms "vertical", "horizontal", "left", "right" and the like, as used herein, are only used for an illustrative purpose and are not the only embodiment.

Unless otherwise defined, all technical and scientific terms used herein have the same meanings as the terms commonly understood by those skilled in the art. Terms used in the description of the present embodiment in the present disclosure are only used to describe specific embodiments and not intended to limit the present disclosure.

Figure 1:
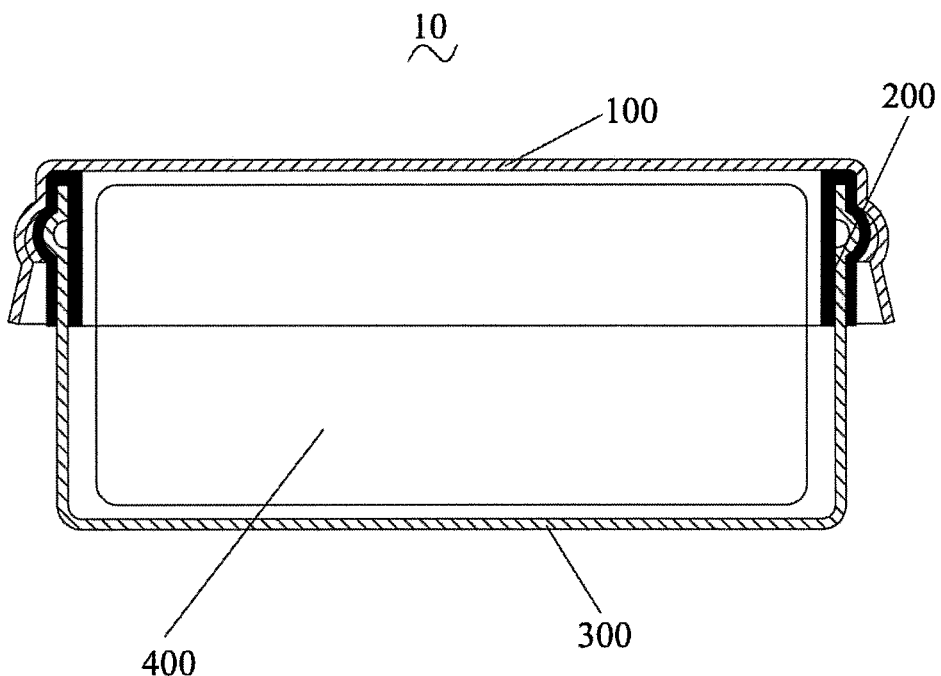
FIG. 1 is a sectional view of a button-type lithium cell before sealing in the existing art.
Figure 2:
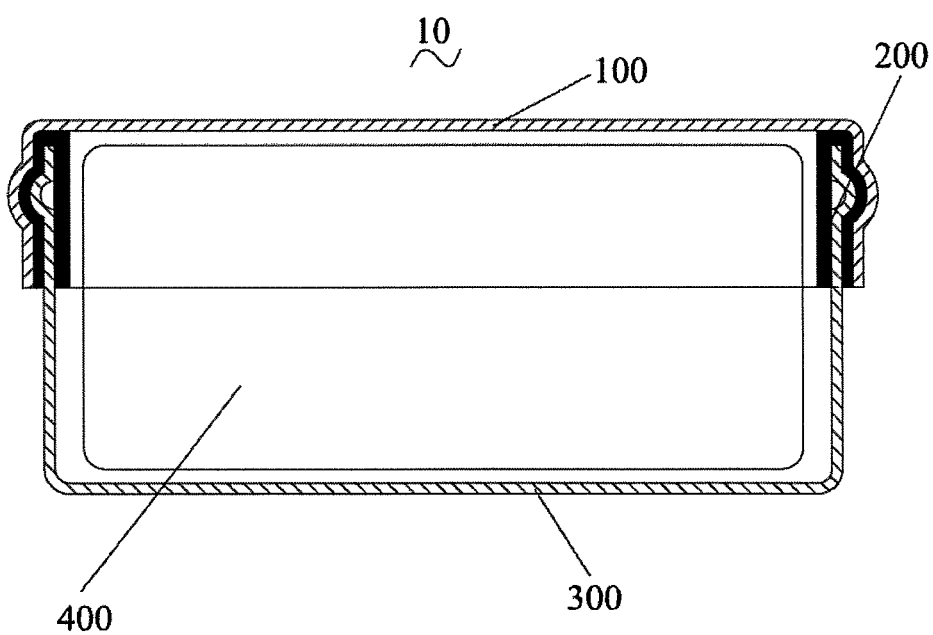
FIG. 2 is a sectional view of a button-type lithium cell after sealing in the existing art.
Figure 3:
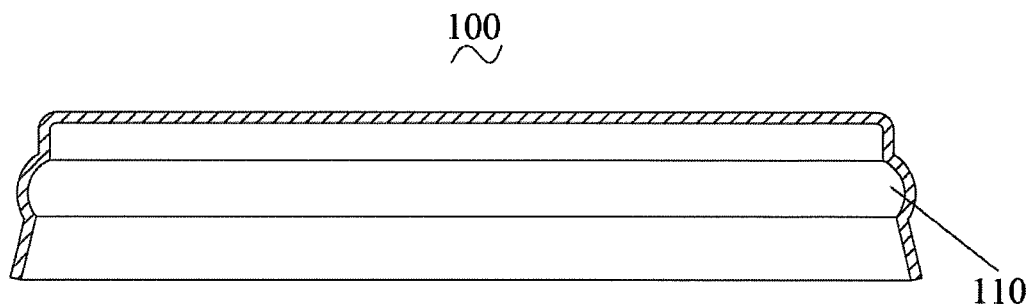
FIG. 3 is a sectional view of a cell cover of the button-type lithium cell in the existing art illustrated in FIG. 1.
Figure 4:
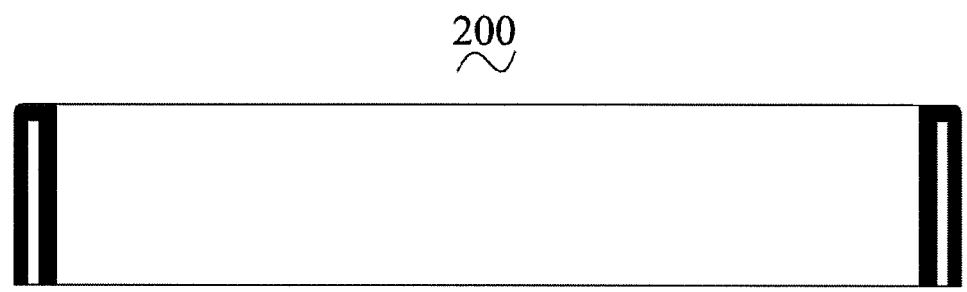
FIG. 4 is a sectional view of a sealing ring of the button-type lithium cell in the existing art illustrated in FIG. 1.
Figure 5:
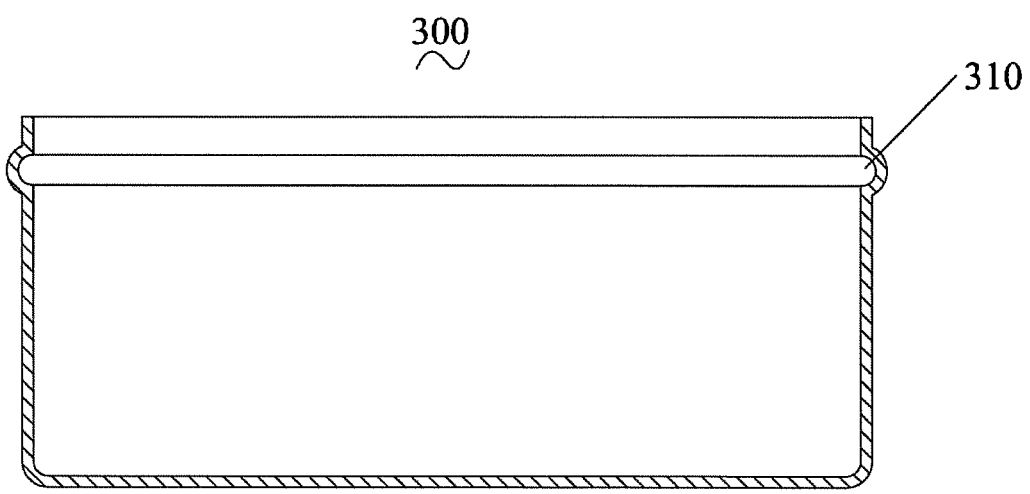
FIG. 5 is a sectional view of a cell casing of the button-type lithium cell in the existing art illustrated in FIG. 1.
Figure 6:
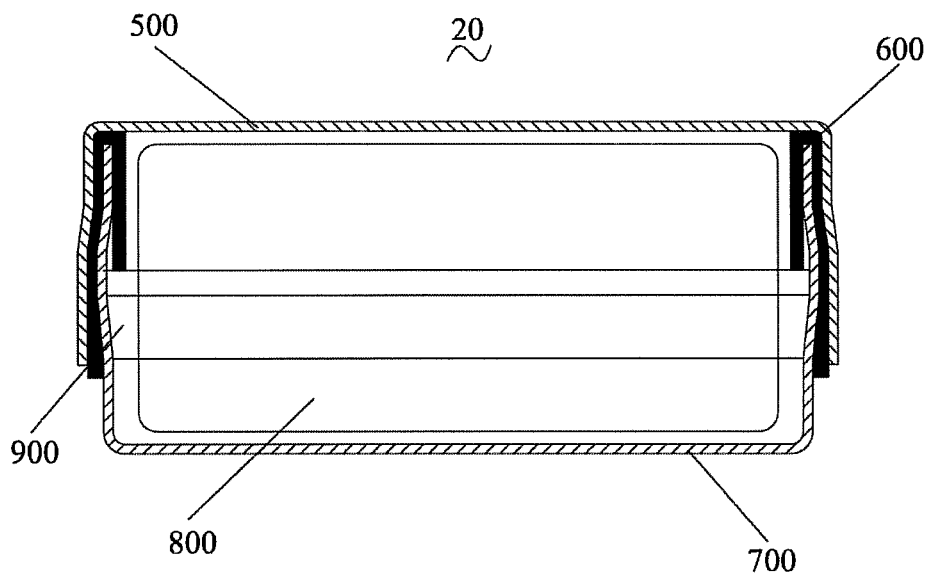
FIG. 6 is a sectional view of a button-type lithium cell sealing structure before sealing according to an embodiment of the present disclosure.
Figure 7:
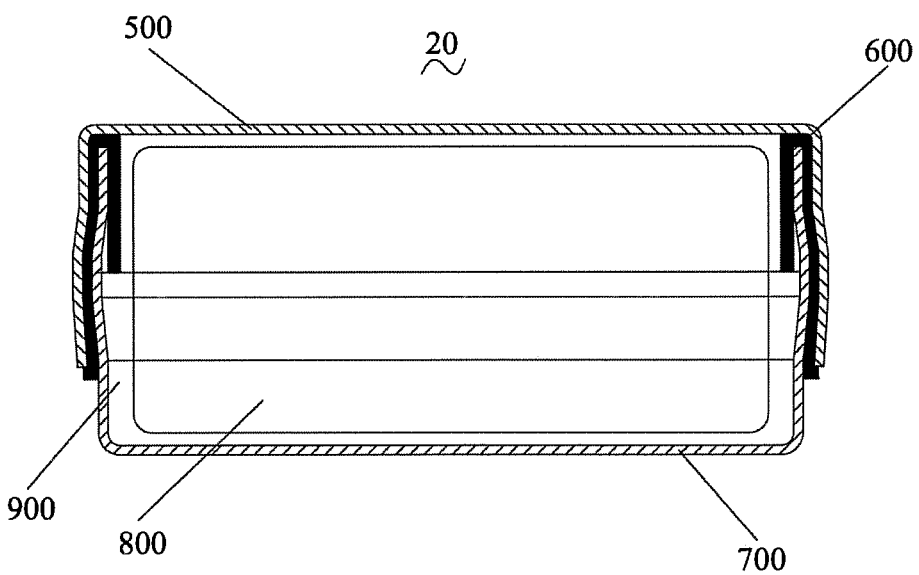
FIG. 7 is a sectional view of a button-type lithium cell sealing structure after sealing according to an embodiment of the present disclosure.

As illustrated in FIGS. 6 and 7, a structure for sealing the button-type lithium cell 20 includes: a cell cover 500, a sealing ring 600 and a cell casing 700. In the present embodiment, the cell cover 500 and the cell casing 700 are both hollow cylindrical structures having a first opened end and a second closed end. Optionally, the structure 20 further includes a jelly roll 800. The jelly roll 800 is received in a sealed chamber formed by the cell cover 500 and the cell casing 700.

Figure 8:
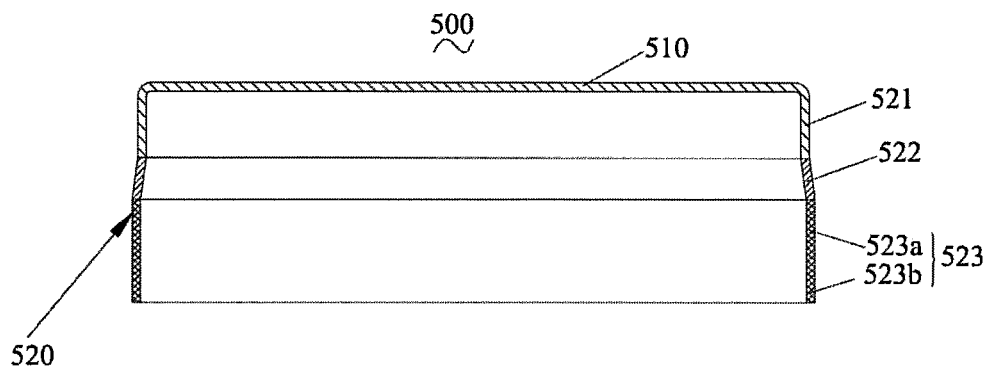
FIG. 8 is a sectional view of a cell cover of the button-type lithium cell sealing structure illustrated in FIG. 6.

As illustrated in FIG. 8, the cell cover 500 includes an overlapping structure 510. The overlapping structure 510 includes a first overlapping portion 521, a second overlapping portion 522 and a third overlapping portion 523 which are connected in sequence. The third overlapping portion 523 includes a locking portion 523a and a sealing portion 523b. The first overlapping portion 521 is a cylindrical side structure, the second overlapping portion 522 is a conical side structure, the locking portion 523a is a cylindrical side structure and the sealing portion 523b is a conical side structure. Optionally, in the present embodiment, the cylindrical side structure is a hollow cylindrical structure and the conical side structure is a hollow and truncated conical structure with two opened ends. For example, the first overlapping portion 521 is a hollow cylindrical structure with one opened end; the second overlapping portion 522 is a hollow and truncated conical structure with two opened ends; the locking portion 523a is a hollow cylindrical structure with two opened ends; and the sealing portion 523b is a hollow truncated conical structure with two opened ends.

Figure 10:
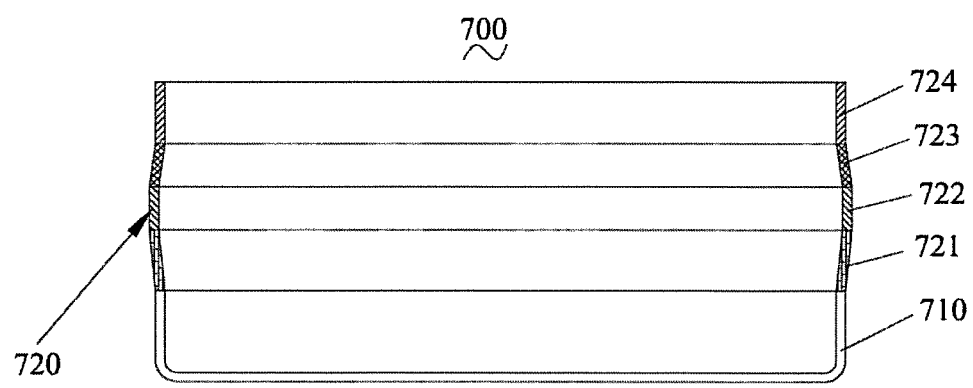
FIG. 10 is a sectional view of a cell casing of the button-type lithium cell sealing structure illustrated in FIG. 6.

As illustrated in FIG. 10, the cell casing 700 includes a sealing structure 710. The sealing structure 710 includes a first sealing portion 721, a second sealing portion 722, a third sealing portion 723 and a fourth sealing portion 724 which are connected in sequence. The first sealing portion 721 and the third sealing portion 723 are both conical side structures, and the second sealing portion 722 and the fourth sealing portion 724 are both cylindrical side structures.

The first overlapping portion 521 abuts against the fourth sealing portion 724 through the sealing ring 600. The second overlapping portion 522 abuts against the third sealing portion 723 through the sealing ring 600. The locking portion 523a of the third overlapping portion 523 abuts against the second sealing portion 722 through the sealing ring 600. The sealing portion 523b of the third overlapping portion 523 abuts against the first sealing portion 721 through the sealing ring 600.

In the present embodiment, the overlapping structure 510 includes the first overlapping portion 521, the second overlapping portion 522 and the third overlapping portion 523 which are connected in sequence. The third overlapping portion 523 includes the locking portion 523a and the sealing portion 523b. The sealing structure 710 includes the first sealing portion 721, the second sealing portion 722, the third sealing portion 723 and the fourth sealing portion 724 which are connected in sequence. When the cell cover 500 is covered onto the cell casing 700, the first overlapping portion 521 abuts against the fourth sealing portion 724, the second overlapping portion 522 abuts against the third sealing portion 723, the locking portion 523a of the third overlapping portion 523 abuts against the second sealing portion 722, and the sealing portion 523b of the third overlapping portion 523 abuts against the first sealing portion 721, so as to press the sealing ring 600 tightly between the overlapping structure 510 and the sealing structure 710 and achieve sealing.

Figure 9:
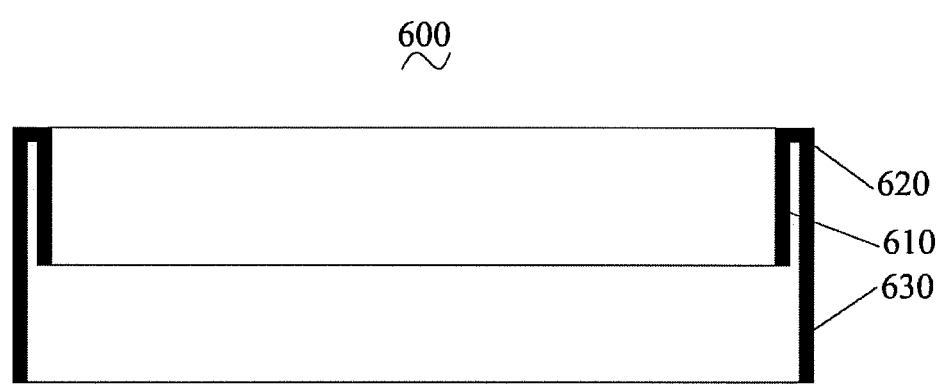
FIG. 9 is a sectional view of a sealing ring of the button-type lithium cell sealing structure illustrated in FIG. 6.

As illustrated in FIG. 9, a structure 630 of the sealing ring 600 includes a first sealing surface, a second sealing surface, a third sealing surface and a fourth sealing surface which are connected in sequence. Optionally, the first sealing surface is pressed between the first overlapping portion 521 and the fourth sealing portion 724. The second sealing surface is squeezed between the second overlapping portion 522 and the third sealing portion 722. The third sealing surface is squeezed between the locking portion 523a of the third overlapping portion 523 and the second sealing portion 723. The fourth sealing surface is squeezed between the sealing portion 523b of the third overlapping portion 523 and the first sealing portion 721.

Optionally, in hemming and shrinking process, the second overlapping portion 522 and the sealing portion 523b form conical side sealing structures in reverse directions (as illustrated in FIG. 8). Optionally, the first sealing portion 721 and the third sealing portion 723 also form the conical side sealing structures in reverse directions (as illustrated in FIG. 10). The conical side sealing structures in reverse directions have a more effective fastening function and prevent the sealing portion 523b from swinging when the sealing portion 523b is hemmed and shrunk for sealing by rotation of the cell cover. More importantly, the conical side sealing structures in reverse directions deform the structure 630 of the sealing ring 600 by squeezing the structure 630 of the sealing ring 600, thereby achieving more effective sealing and increasing fastening stability of the cell casing 700, the sealing ring 600 and the cell cover 500.

An overlapping structure 520 includes the first overlapping portion 521, the second overlapping portion 522 and the third overlapping portion 523 which are connected in sequence. The first overlapping portion 521, the second overlapping portion 522 and the third overlapping portion 523 form a rugged structure. Meanwhile, a sealing structure 720 includes the first sealing portion 721, a second sealing portion 722, a third sealing portion 723 and a fourth sealing portion 724 which are connected sequence. The first sealing portion 721, the second sealing portion 722, the third sealing portion 723 and the fourth sealing portion 724 also form a rugged structure. The structure 630 of the sealing ring 600 is squeezed tightly between the overlapping structure 520 and the sealing structure 720. Because of the rugged structures, the structure 630 of the sealing ring 600 has a larger contact area with the cell cover 500 and the cell casing 700, resulting in a larger sealing area and better sealing performance. The sealing ring 600 improves the air tightness between the overlapping structure 520 and the sealing structure 720 to prevent the occurrence of the liquid leakage of the cell.

The rugged structure formed by the first overlapping portion 521, the second overlapping portion 522 and the third overlapping portion 523 interworks with the rugged structure formed by the first sealing portion 721, the second sealing portion 722, the third sealing portion 723 and the fourth sealing portion 724: A protruding structure is trapped in a groove structure to form a latching structure, so that the cell cover 500 is tightly fastened in the cell casing 700 and not easily detached, thereby improving the fastening stability.

As illustrated in FIG. 8, the third overlapping portion 523 includes the sealing portion 523b. When the cell cover 500 is covered onto the cell casing 700, the sealing portion 523b of the third overlapping portion 523 is hemmed and shrunk by a special-purpose device (as illustrated in FIG. 7) to achieve the sealing and further improve the fastening stability.

The first overlapping portion 521 has a cylindrical shape, the second overlapping portion 522 has a truncated cone shape, the locking portion 523a has a cylindrical shape, and the sealing portion 523b has a truncated cone shape. Compared with a conventional design of providing a circular arc groove, such a structure has the overlapping structure 520 which does not produce a sharp cutter-shaped protruding structure and similarly, the sealing structure 720 does not produce the sharp cutter-shaped protruding structure so that the structure 630 of the sealing ring 600 will not be damaged and broken. In the final assembling stage of assembly, the sealing portion 523b of the third overlapping portion 523 is hemmed and shrunk by a special-purpose device to achieve fastening. Even if the sealing portion 523b cuts the structure 630 of the sealing ring 600 when the sealing portion 523b is hemmed and shrunk, it only damages a minute portion in the rear of the structure 630 of the sealing ring 600 and the whole structure 630 will not be damaged seriously.

In the present embodiment, the sealing ring 600 includes a protruding end 620 protruding from a connection point of the overlapping structure 520 and the sealing structure 720 (as illustrated in FIG. 7), so as to more effectively prevent the cell cover 500 and the cell casing 700 from contacting with each other to result in a short circuit.

Optionally, the sealing ring 600 further includes a pre-positioned ring structure 610. The pre-positioned ring structure 610 is elastically nested in one end surface of the fourth sealing portion 724. The sealing ring 600 is pre-fastened by providing the pre-positioned ring structure 610. That is, the sealing ring 600 is nested in the one end surface of the fourth sealing portion 724 of the cell casing 700 with the pre-positioned ring structure 610, thereby preventing the sealing ring 600 from being detached and preparing for the subsequent stable sealing when the cell cover 500 is covered onto the cell casing 700.

The present embodiment further provides a method for sealing the button-type lithium cell by use of the above structure 20. The method includes the steps described below.

The sealing ring 600 is nested in the cell casing 700.

The cell cover 500 is covered onto the cell casing 700 so that the first overlapping portion 521 abuts against the fourth sealing portion 724 through the sealing ring 600, the second overlapping portion 522 abuts against the third sealing portion 723 through the sealing ring 600, the locking portion 523a of the third overlapping portion 523 abuts against the second sealing portion 722 through the sealing ring 600.

The sealing portion 523b of the third overlapping portion 523 is hemmed and shrunk so that the sealing portion 523b of the third overlapping portion 523 abuts against the first sealing portion 721 through the sealing ring 600.

In the structure 20 of the present embodiment, the cell cover 500, the sealing ring 600 and the cell casing 700 are provided, and in particular, the overlapping structure 520 of the cell cover 500 and the sealing structure 720 of the cell casing 700 are optimized, so as to prevent the seal ring 600 from being damaged and broken in the sealing process and avoid the liquid leakage of the cell, thereby improving the overall sealing performance.

INDUSTRIAL APPLICABILITY

The structure for sealing the button-type lithium cell provided by the present disclosure can prevent the sealing ring from being damaged and broken in the sealing process and avoid the liquid leakage of the cell, thereby improving the overall sealing performance.

What is claimed is:

1. A structure for sealing a button-type lithium cell, comprising: a cell cover, a sealing ring and a cell casing, wherein the cell cover comprises an overlapping structure, the overlapping structure comprises a first overlapping portion, a second overlapping portion and a third overlapping portion which are connected in sequence, and the third overlapping portion comprises a locking portion and a sealing portion, wherein the first overlapping portion is a hollow cylindrical structure with one opened end, the second overlapping portion is a hollow and truncated conical structure with two opened ends, the locking portion is a hollow cylindrical structure with two opened ends and the sealing portion is a hollow and truncated conical structure with two opened ends;

the cell casing comprises a sealing structure, and the sealing structure comprises a first sealing portion, a second sealing portion, a third sealing portion and a fourth sealing portion which are connected in sequence, wherein the first sealing portion and the third sealing portion are both conical side structures and the second sealing portion and the fourth sealing portion are both cylindrical side structures, and the cylindrical side structure is a hollow cylindrical structure and the conical side structure is a hollow and truncated conical structure with two opened ends; and the first overlapping portion abuts against the fourth sealing portion through the sealing ring, the second overlapping portion abuts against the third sealing portion through the sealing ring, the locking portion of the third overlapping portion abuts against the second sealing portion through the sealing ring, and the sealing portion of the third overlapping portion abuts against the first sealing portion through the sealing ring.

2. The structure of claim 1, further comprising a jelly roll, wherein the jelly roll is received in a sealed chamber formed by the cell cover and the cell casing.

3. The structure of claim 1, wherein the cell cover is a hollow cylindrical structure having a first opened end and a second closed end.

4. The structure of claim 1, wherein the cell casing is a hollow cylindrical structure having a first opened end and a second closed end.

5. The structure of claim 1, wherein the first overlapping portion, the second overlapping portion and the third overlapping portion are formed integrally.

6. The structure of claim 1, wherein the first sealing portion, the second sealing portion, the third sealing portion and the fourth sealing portion are formed integrally.

7. A method for sealing a button-type lithium cell, by use of the structure of claim 1, comprising:
nesting the sealing ring in the cell casing;
covering the cell cover onto the cell casing so that the first overlapping portion abuts against the fourth sealing portion through the sealing ring, the second overlapping portion abuts against the third sealing portion through the sealing ring, the locking portion of the third overlapping portion abuts against the second sealing portion through the sealing ring; and
hemming and shrinking the sealing portion of the third overlapping portion so that the sealing portion of the third overlapping portion abuts against the first sealing portion through the sealing ring.

8. The structure of claim 1, wherein the sealing ring comprises a protruding end protruding from a connection point of the overlapping structure and the sealing structure.

9. The structure of claim 1, wherein the sealing ring comprises a pre-positioned ring structure which is elastically nested in one end surface of the fourth sealing portion.

10. The structure of claim 1, wherein the first overlapping portion is a hollow cylindrical structure with one opened end.

11. The structure of claim 1, wherein the second overlapping portion is a hollow truncated conical structure with two opened ends.

12. The structure of claim 1, wherein the locking portion is a hollow cylindrical structure with two opened ends.

13. The structure of claim 1, wherein the sealing portion is a hollow truncated conical structure with two opened ends.

14. The method of claim 7, further comprising:
after nesting the sealing ring in the cell casing, receiving a jelly roll in a sealed chamber formed by the cell cover and the cell casing.

15. The method of claim 7, wherein the sealing ring comprises a pre-positioned ring structure, the step of nesting the sealing ring in the cell casing comprises:
elastically nesting the pre-positioned ring structure in one end surface of a fourth sealing portion of the cell casing.

16. The method of claim 7, wherein the cell cover is a hollow cylindrical structure having a first opened end and a second closed end.

17. The method of claim 7, wherein the cell casing is a hollow cylindrical structure having a first opened end and a second closed end.

18. The method of claim 7, wherein the first overlapping portion, the second overlapping portion and the third overlapping portion are formed integrally.

19. The method of claim 7, wherein the first sealing portion, the second sealing portion, the third sealing portion and the fourth sealing portion are formed integrally.

* * * * *